(12) United States Patent
Nedergaard et al.

(10) Patent No.: US 12,258,970 B2
(45) Date of Patent: Mar. 25, 2025

(54) CENTRIFUGAL PUMP

(71) Applicant: GRUNDFOS HOLDING A/S, Bjerringbro (DK)

(72) Inventors: Christoffer Nedergaard, Bjerringbro (DK); Kurt Laursen, Bjerringbro (DK); Martin Lindemann, Bjerringbro (DK); Henrik Duch Simonsen, Bjerringbro (DK)

(73) Assignee: Grundfos Holding A/S, Bjerringbro (DK)

( * ) Notice: Subject to any disclaimer, the term of this patent is extended or adjusted under 35 U.S.C. 154(b) by 0 days.

(21) Appl. No.: 18/560,339

(22) PCT Filed: May 9, 2022

(86) PCT No.: PCT/EP2022/062436
§ 371 (c)(1),
(2) Date: Nov. 10, 2023

(87) PCT Pub. No.: WO2022/238300
PCT Pub. Date: Nov. 17, 2022

(65) Prior Publication Data
US 2024/0240641 A1  Jul. 18, 2024

(30) Foreign Application Priority Data

May 12, 2021 (DK) .................................. 202170233

(51) Int. Cl.
*F04D 15/00* (2006.01)
*F04D 29/42* (2006.01)
*G01F 1/075* (2006.01)

(52) U.S. Cl.
CPC ......... *F04D 15/0088* (2013.01); *F04D 29/42* (2013.01); *G01F 1/075* (2013.01)

(58) Field of Classification Search
CPC ....... F04D 15/0088; F04D 29/42; G01F 1/075
See application file for complete search history.

(56) References Cited

U.S. PATENT DOCUMENTS

| 4,864,869 A * | 9/1989 | Glasheen ................ G01F 1/115 324/174 |
| 8,454,330 B2 | 6/2013 | Lyngholm |

(Continued)

FOREIGN PATENT DOCUMENTS

| EP | 1431584 A2 | 6/2004 |
| EP | 1595489 A1 | 11/2005 |

(Continued)

*Primary Examiner* — Topaz L. Elliott
*Assistant Examiner* — Andrew J Marien
(74) *Attorney, Agent, or Firm* — IceMiller LLP (57) ABSTRACT

The centrifugal pump includes a flow measuring device (3) adapted to measure a delivery flow through the pump by means of a turbine wheel (32) including at least one permanent magnet (42). The flow measuring device includes at least one magnetic flux sensor (50, 51) arranged in a sensor housing (48) mounted in an outer wall of the pump casing (2). A rotatable disc (52) is fixed on a pump shaft and includes at least one permanent magnet (53). The flow measuring device is adapted to measure the delivery flow on the basis of a first measurement signal generated by the at least one magnetic flux sensor as a result of the rotation of the turbine wheel and to include in the measurement of the delivery flow a second measurement signal generated by the at least one magnetic flux sensor as a result of the rotation of the rotatable disc.

13 Claims, 4 Drawing Sheets

(56) References Cited

U.S. PATENT DOCUMENTS

| | | | |
|---|---|---|---|
| 10,823,183 B2 | 11/2020 | Svarre et al. | |
| 2009/0162223 A1 | 6/2009 | Lyngholm | |
| 2015/0322940 A1* | 11/2015 | Horvath | A61M 60/538 |
| | | | 417/42 |
| 2017/0175749 A1* | 6/2017 | Svarre | F04D 29/28 |
| 2019/0339162 A1* | 11/2019 | Munk | G01N 29/036 |

FOREIGN PATENT DOCUMENTS

| | | |
|---|---|---|
| EP | 2072829 A1 | 6/2009 |
| EP | 3184823 A1 | 6/2017 |
| JP | 2000102605 A | 4/2000 |
| JP | 2005257309 A | 9/2005 |
| JP | 2013099969 A | 5/2013 |

* cited by examiner

CENTRIFUGAL PUMP

CROSS REFERENCE TO RELATED APPLICATIONS

This application is a national phase application under Section 35 U.S.C. Section 371 of International Application No. PCT/EP2022/062436, filed on May 9, 2022, which published on Nov. 17, 2022, under International Publication No. WO/2022/238300, and which claims the benefit of and priority to Denmark Patent Application No. PA202170233, filed May 12, 2021, which is incorporated herein by reference in its entirety.

The present invention relates to a centrifugal pump including a pump shaft, a pump casing enclosing at least one pump stage with an impeller mounted on an internal part of the pump shaft and fixed to the pump shaft for rotation with the pump shaft, a flow measuring device adapted to measure a delivery flow through the centrifugal pump by means of a turbine wheel arranged in the pump casing rotationally about the pump shaft and rotationally in relation to the pump shaft, the turbine wheel being exposed to the delivery flow through the centrifugal pump, the turbine wheel including at least one permanent magnet, the flow measuring device including at least one magnetic flux sensor, the flow measuring device being adapted to measure the delivery flow on the basis of at least a first measurement signal generated by the at least one magnetic flux sensor as a result of the rotation of the turbine wheel, and the at least one magnetic flux sensor being arranged in a sensor housing mounted in an opening formed in an outer wall of the pump casing.

EP 3 184 823 B1 (Grundfos Holding A/S) discloses a centrifugal pump including at least one pump stage. This pump stage includes an impeller which is mounted rotationally fixed on a pump shaft. Apart from the pump stage, the centrifugal pump is equipped with a turbine wheel which is arranged on the pump shaft, without a movement coupling to the pump shaft, in the delivery flow of the centrifugal pump. This turbine wheel is provided with three signal means in the form of permanent magnets and forms a transducer of a flow measuring device for measuring a delivery flow through the centrifugal pump. The flow measuring device further includes a sensor having a sensor housing inserted into an opening formed on an outer wall of the pump casing. This sensor includes a signal receiver in the form of a magnetic flux sensor which on rotation of the turbine wheel detects the magnetic fields which results from the three permanent magnets. A control device which is signal-connected to the sensor determines the rotation speed of the turbine wheel and, on the basis thereof, the delivery flow through the centrifugal pump.

However, in order to more precisely determine the delivery flow of a centrifugal pump, the delivery flow determined on the basis of a turbine wheel exposed to the delivery flow through the centrifugal pump must be corrected according to the rotational speed of the impeller or impellers of the centrifugal pump. The rotational speed of the impeller or impellers of the centrifugal pump may be determined in a number of ways. For instance, the rotational speed may be determined on the basis of a signal received from a VFD (variable-frequency drive) for an AC (alternating current) motor driving the pump.

In this case, apart from the fact that extra cabling might be needed between the VFD and the flow measuring device, a huge mix of signals/communication protocols of all existing VFD's would have to be covered. Furthermore, the direct link between motor rotation and pump rotation may not be one-to-one due to motor slip, or due to a broken coupling. In other words, this would be an indirect measurement, and as such, the measurement would not always be reliable.

Alternatively, an rpm sensor could be attached to the electric motor, whereby the rotation of a fan and/or shaft could be measured using optical or magnetic measurements. This could be done using off-the-shelf components and solutions, however, this would require extra mounting on the pump and extra cabling to the flow measuring device. Furthermore, as with the solution mentioned just above, this would be an indirect measurement, and as such, the measurement would not always be reliable.

Generally, the challenge with existing methods of providing an rpm measurement for a flow measuring device of a centrifugal pump is that they either increase the installation complexity or comes with excessive development costs (e.g. mapping all possible communication protocols for all VFD's in the world).

The object of the present invention is to provide, in a simpler way than according to existing solutions, a centrifugal pump adapted to measure delivery flow based on both the rotation of a turbine wheel and the rotational speed of the impeller or impellers of the centrifugal pump.

In view of this object, a rotatable disc is mounted on the pump shaft and fixed to the pump shaft for rotation with the pump shaft, the rotatable disc includes at least one permanent magnet, and the flow measuring device is adapted to include in the measurement of the delivery flow a second measurement signal generated by the at least one magnetic flux sensor as a result of the rotation of the rotatable disc.

In this way, because both the first measurement signal resulting from the rotation of the turbine wheel and the second measurement signal resulting from the rotation of the rotatable disc are generated by the at least one magnetic flux sensor which is arranged in the sensor housing mounted in the opening of the outer wall of the pump casing, no extra cabling is needed between the flow measuring device and other sensors. The installation of the flow measuring device is furthermore easy and simple in that the sensor housing may simply be threaded into said opening of the pump casing, which could typically be a vent hole of the pump. As an additional advantage, the measurement of the rotational speed is a direct measurement of the rotational speed of the pump shaft, and therefore, the measurement is more reliable. For instance, it would be possible to detect if the turbine wheel should get stuck on the pump shaft, because in this case, the direction of the detected rotation would be wrong. Furthermore, according to the present invention, it may be easy to check if the rotatable disc is mounted correctly.

In an embodiment, the pump shaft extends through a shaft seal arranged in the outer wall of the pump casing, an external part of the pump shaft has a coupling end for connection with a motor shaft, and the rotatable disc is mounted on the external part of the pump shaft. Thereby, the rotatable disc is easily accessible outside the casing of the pump and does not take up space inside the pump casing. It is indeed an advantage that the rotatable disc is directly accessible and visible so that is may be controlled that it is correctly mounted and so that is may be easily serviced, if necessary. It is furthermore an advantage that the magnets of the rotatable disc do not have to come into contact with the fluid pumped by the centrifugal pump. Therefore, the choice of material for the magnets is greater. For instance, neodymium-magnets may be used which are much stronger than standard permanent magnets. Neodymium-magnets should not be used in contact with drinking water.

In a structurally particularly advantageous embodiment, the rotatable disc is composed by two disc halves clamped together and thereby clamping the pump shaft in a central hole through the rotatable disc. Thereby, the rotatable disc may easily be mounted on the pump shaft.

The rotatable disc may for instance be clamped on a ring of the shaft seal.

In an embodiment, the at least one magnetic flux sensor includes a first magnetic flux sensor and a second magnetic flux sensor, the first magnetic flux sensor is adapted to generate the first measurement signal as a result of the rotation of the turbine wheel, and the second magnetic flux sensor is adapted to generate the second measurement signal as a result of the rotation of the rotatable disc. Thereby, the first and second measurement signals need not be separated in software by demodulation, as the signals are already created separately. Furthermore, the first and second magnetic flux sensors may be positioned differently in the sensor housing, so that the position of each magnetic flux sensor may be optimised in relation to the position of the magnets of the turbine wheel and the magnets of the rotatable disc, respectively. Thereby, the provided first and second measurement signals may be more reliable.

In an embodiment, the sensor housing is elongated and extends through the opening formed in the outer wall of the pump casing, the sensor housing includes a first part arranged inside the pump casing and a second part arranged outside the pump casing, the first magnetic flux sensor is arranged in the first part of the sensor housing, and the second magnetic flux sensor is arranged in the second part of the sensor housing. Thereby, in particular the position of the first magnetic flux sensor may be optimised in that it may be positioned very close to the position of the magnets of the turbine wheel and inside the pump casing, so that the magnetic field of the turbine wheel does not have to be detected through the pump casing. A short distance between the first magnetic flux sensor and the magnets of the turbine wheel will reduce possible disturbances of the signal. On the other hand, also the position of the second magnetic flux sensor may be optimised in that it may be positioned outside the pump casing, so that the magnetic field of the magnets of the rotatable disc does not have to be detected through the pump casing. Thereby, the provided first and second measurement signals may be even more reliable.

In an embodiment, the first magnetic flux sensor and the second magnetic flux sensor are arranged in the sensor housing with a mutual first distance in a longitudinal direction of the sensor housing, the first magnetic flux sensor is arranged at a, during rotation of the turbine wheel, shortest second distance from the at least one permanent magnet of the turbine wheel, the second magnetic flux sensor is arranged at a, during rotation of the rotatable disc, shortest third distance from the at least one permanent magnet of the rotatable disc, and the shortest third distance is at least 2 times, preferably at least 2.5 times, and most preferred at least 3 times, the shortest second distance. Thereby, the provided first and second measurement signals may be even more reliable.

In an embodiment, the mutual first distance is within +30 percent, preferably within +20 percent, and most preferred within +10 percent of the shortest third distance. Thereby, the provided first and second measurement signals may be even more reliable.

In an embodiment, at least the second magnetic flux sensor is of an omnidirectional type. Thereby, the exact position of the rotatable disc in relation to the second magnetic flux sensor may not be critical. This may be an advantage, for instance because the same sensor housing design may be used for centrifugal pumps of different size, whereby a preferred position of the rotatable disc on the pump shaft may vary due to various constructional considerations.

In an embodiment, the first magnetic flux sensor has a direction of maximum sensitivity, and the first magnetic flux sensor is arranged with its direction of maximum sensitivity extending in the longitudinal direction of the sensor housing and in the direction of the, during rotation of the turbine wheel, closest position of the at least one permanent magnet of the turbine wheel. Thereby, the sensitivity of the first magnetic flux sensor may be maximised. This may be advantageous in order to obtain a reliable first measurement signal without using special magnets providing a stronger magnetic field.

In an embodiment, the flow measuring device includes a processor adapted to calculate an uncorrected delivery flow on the basis of the first measurement signal generated by the at least one magnetic flux sensor as a result of the rotation of the turbine wheel, and the processor is adapted to calculate a corrected delivery flow by correcting the uncorrected delivery flow by means of a correction factor based on the second measurement signal generated by the at least one magnetic flux sensor as a result of the rotation of the rotatable disc. Thereby, the flow measuring device may be provided as a single unit adapted to provide a delivery flow measurement corrected on the basis of the rotation of the impeller or impellers of the centrifugal pump. The flow measuring device may further be provided with a single sensor housing including the entire flow measuring device apart from the turbine wheel and the rotatable disc.

The invention will now be explained in more detail below by means of examples of embodiments with reference to the very schematic drawing, in which.

Figure 1:
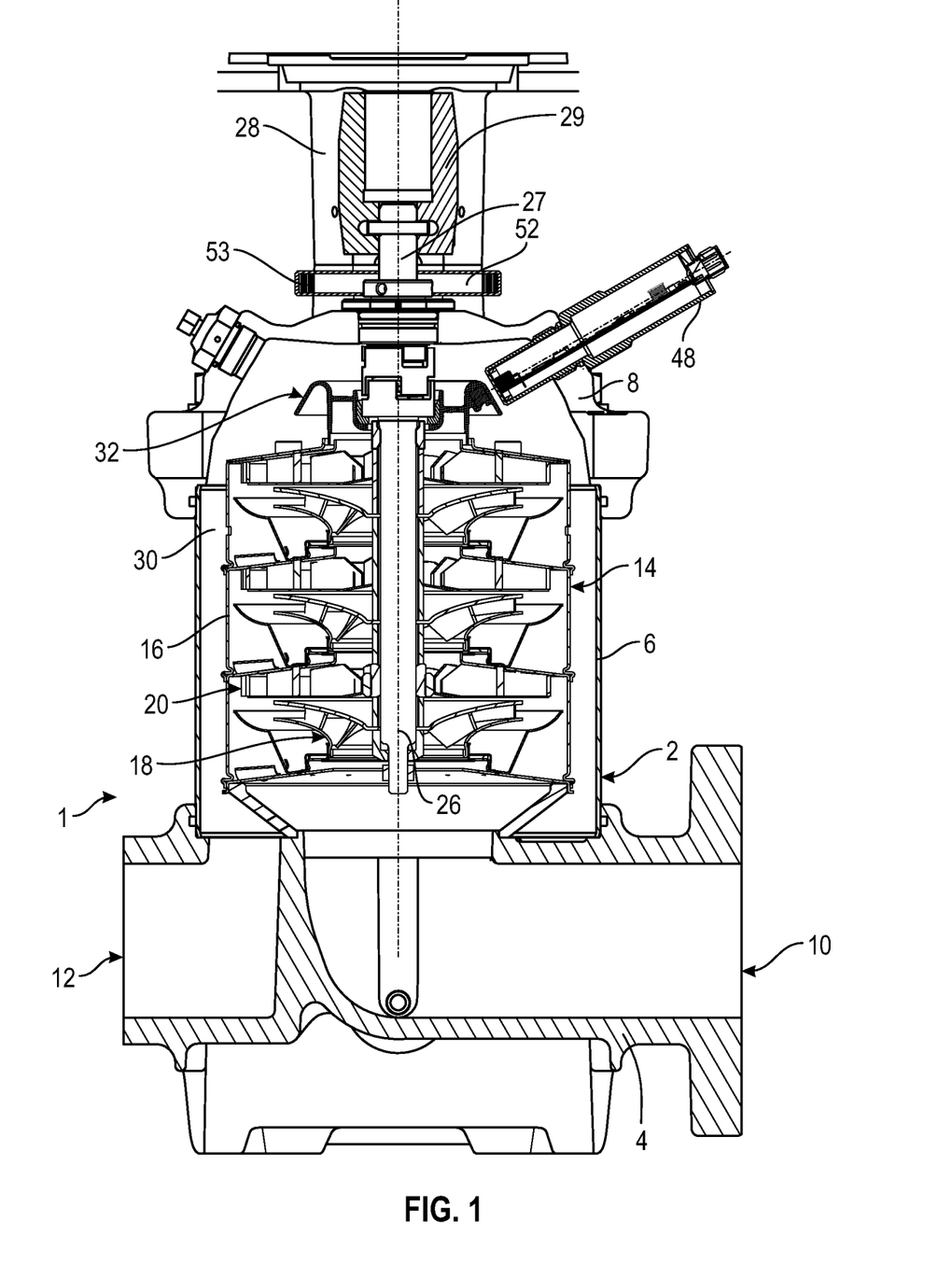
FIG. 1 is an axial section through an embodiment of a centrifugal pump according to the present invention.
Figure 2:
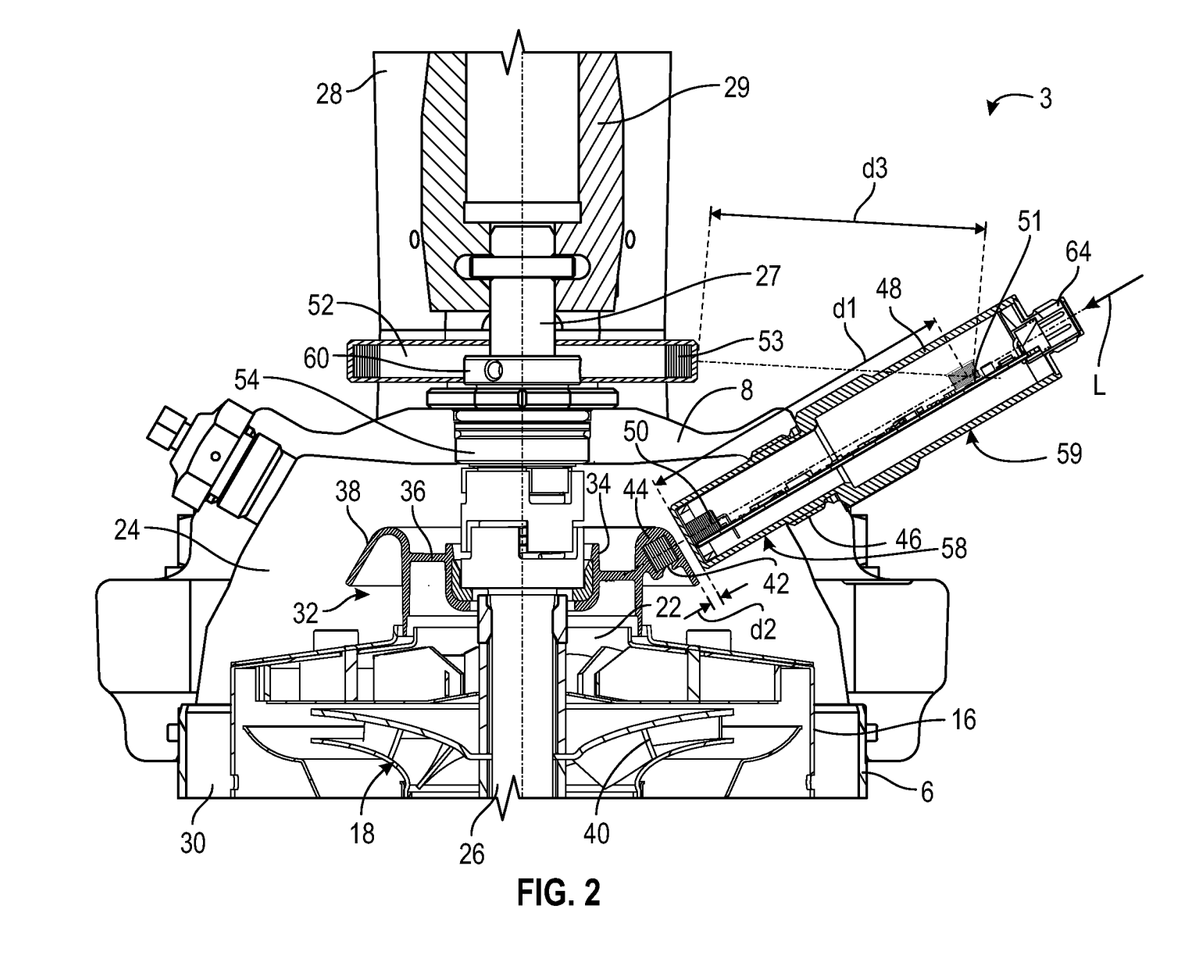
FIG. 2 is a detail of FIG. 1 illustrated on a larger scale.
Figure 3:
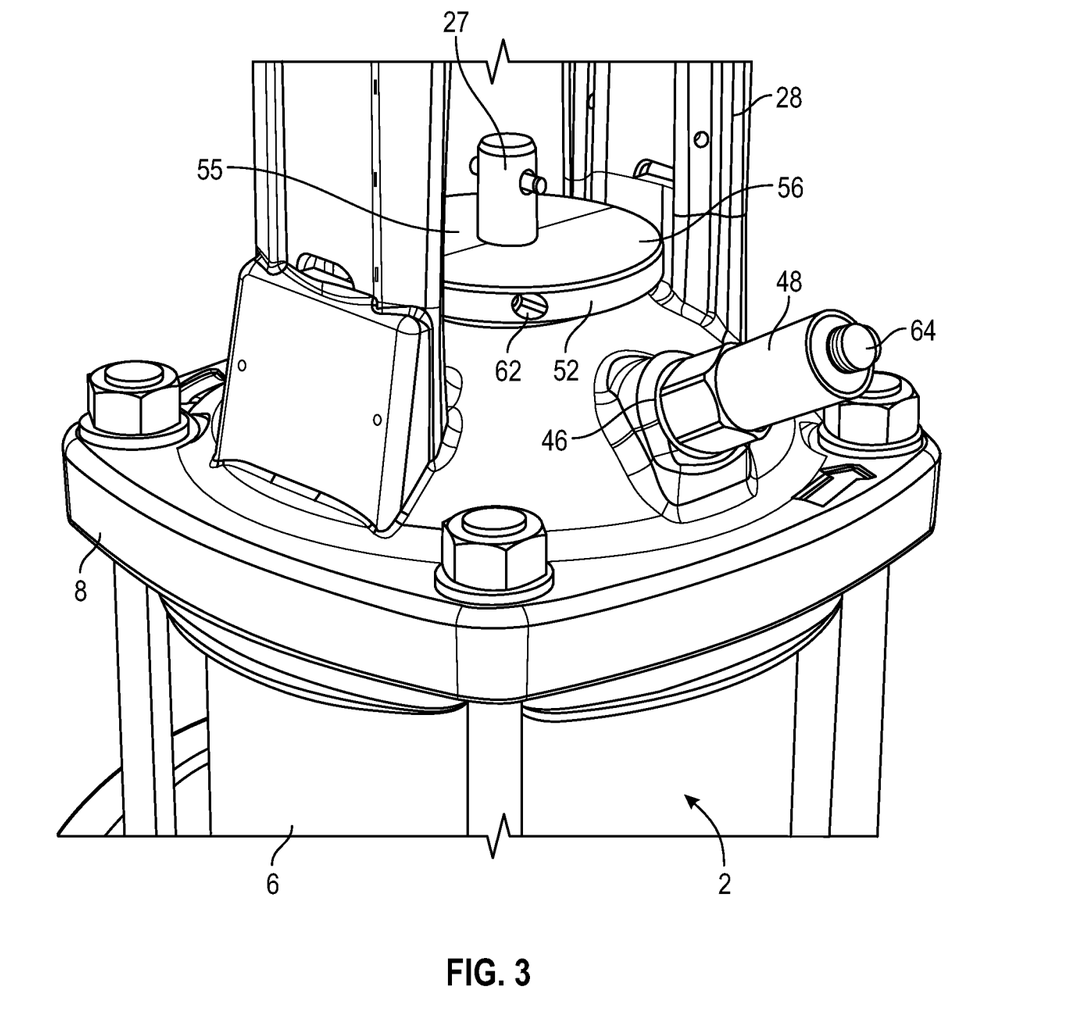
FIG. 3 is a perspective view illustrating a part of the centrifugal pump of FIG. 1.

FIGS. 1 to 3 illustrate an embodiment of a centrifugal pump 1 according to the present invention. The centrifugal pump 1 includes a pump casing 2 having a casing lower part 4, a casing upper part 8, and a hollow-cylindrical casing middle part 6 arranged there between. A fluid inlet 10 and a fluid outlet 12 of the centrifugal pump 1 are formed on the casing lower part 4. The fluid inlet 10 is flow-connected to five pump stages 14 of the centrifugal pump 1 which are arranged in the region of the casing middle part 6 over one another in the direction of the casing upper part 8. Each of the pump stages 14 includes a housing 16 which is arranged in the pump casing 2 in a stationary manner and in which an impeller 18 and a diffuser 20 are arranged in a manner well-known to the skilled person. The housings 16 are each flow-connected to adjacent housings 16, wherein a housing 16 which is last in the direction of the casing upper part 8 is flow-connected via an opening 22 to a pressure chamber 24 which is formed in the region of the casing upper part 8.

The impellers 18 of the pump stages 14 are connected to a pump shaft 26 in a rotationally fixed manner, said pump shaft extending concentrically to the casing middle part 6 through the pump casing 2 and projecting out of the pump casing 2 at the casing upper part 8. There, an external part 27 of the pump shaft 26 has a coupling end which by means of a coupling 29 is connected to a motor shaft of a drive motor which is not represented and which is mounted on a motor stool 28 which is formed on the casing upper part 8. When the pump shaft 26 is driven, the impellers 18 of the individual pump stages deliver a fluid from the fluid inlet 10 through the pump stages 14 to the pressure chamber 24, from where the fluid flows via an annular gap 30 between the wall of the casing middle part 6 and the housing 16 of the pump stages, to the fluid outlet 12 of the centrifugal pump 1. Alternatively, the fluid outlet 12 could also be situated at the opposite axial end of the centrifugal pump 1.

A turbine wheel 32 is rotatably mounted in the pressure chamber 24, downstream of the pump stage 14 which is last in the flow direction and which is directly adjacent the pressure chamber 24. This turbine wheel 32 is arranged around the pump shaft 26, wherein the pump shaft 26 engages through a hub 34 of the turbine wheel 32, and the turbine wheel 32 is rotatably mounted in relation to the pump shaft 26. Several blades 36, departing from the hub 34, extend outwards in the radial direction, where they are connected to an outer ring 38 of the turbine wheel 32. Hereby, the blades 36 of the turbine wheel 32 in the flow direction of the centrifugal pump are arranged directly above the opening 22 which is formed on the last pump stage 14 and via which the delivery flow in the axial direction of the pump housing flows through the centrifugal pump 1 into the pressure chamber 24. The delivery flow exerts a torque upon the turbine wheel 32 by way of it hitting the blades 36 of the turbine wheel 32, by which means this is brought into a rotational movement. The torque which is exerted by the delivery flow onto the turbine wheel 32 is hereby directed counter to the torque which is exerted upon the impeller 18 via the pump shaft 26 for the purpose of fluid delivery. This is due to the fact that the blades 36 of the turbine wheel 32 are aligned quasi counter to blades 40 of the impeller 18. Thus, the turbine wheel 32 rotates oppositely to the pump shaft 26 in operation.

The turbine wheel 32 forms a transducer of a flow measuring device 3, with which the delivery flow through the centrifugal pump 1 may be continuously determined during the operation of the centrifugal pump, in order to e.g. subsequently be included in the activation of the not shown drive motor for the centrifugal pump 1. The turbine wheel 32, which is represented in FIGS. 1 and 2, for forming a transducer is provided with three signal means in the form of permanent magnets 42 which are arranged in three corresponding recesses 44 formed on the outer peripheral side of the outer ring 38 of the turbine wheel 32 at varying angular distance in order to be able to determine the rotation direction of the turbine wheel 32.

An threaded opening 46 is formed on the casing upper part 8 of the pump casing 2. A sensor housing 48 of the flow measuring device 3 which extends down to the direct vicinity of the outer ring 38 of the turbine wheel 32 is in threaded connection with this opening 46. The opening 46 may additionally serve as a vent opening for the centrifugal pump 1, and a vent opening of an existing pump design may serve for the integration of a flow measuring device 3 according to the present invention.

This sensor housing 48 includes a first magnetic flux sensor 50 which on rotation of the turbine wheel 32 detects the varying magnetic field resulting from the three permanent magnets 42 of the turbine wheel 32.

As seen in FIGS. 1 and 2, a rotatable disc 52 is mounted on the pump shaft 26 and fixed to the pump shaft for rotation with the pump shaft. The rotatable disc 52 includes a number of permanent magnets 53 arranged at its periphery. Furthermore, the sensor housing 48 includes a second magnetic flux sensor 51 which on rotation of the rotatable disc 52 detects the varying magnetic field resulting from the number of permanent magnets 53 of the rotatable disc 52.

The sensor housing 48 is preferably made of corrosion resistant metal, however it could also be made of plastic. However, the sensor housing 48 should generally not be ferromagnetic, as this could disturb the magnetic fields detected by the magnetic flux sensors 50, 51.

The flow measuring device 3 is adapted to measure, during operation of the centrifugal pump 1, the delivery flow of the pump on the basis of a first measurement signal generated by the first magnetic flux sensor 50 as a result of the rotation of the turbine wheel 32. Furthermore, according to the present invention, the flow measuring device 3 is adapted to include in the measurement of the delivery flow a second measurement signal generated by the second magnetic flux sensor 51 as a result of the rotation of the rotatable disc 52.

According to an alternative embodiment of the present invention, a single magnetic flux sensor may be used for generating both the first measurement signal and the second measurement signal. Such single magnetic flux sensor may be arranged at any suitable position in the sensor housing 48. However, by using a separate first magnetic flux sensor 50 for generating the first measurement signal and a separate second magnetic flux sensor 51 for generating the second measurement signal, the first and second measurement signals need not be separated in software by demodulation, as the signals are already created separately. Furthermore, the first and second magnetic flux sensors 50, 51 may be positioned differently in the sensor housing 48, so that the position of each magnetic flux sensor may be optimised in relation to the position of the magnets 42 of the turbine wheel 32 and the magnets 53 of the rotatable disc 52, respectively. Thereby, the provided first and second measurement signals may be more reliable.

As seen in FIG. 2, the pump shaft 26 extends through a shaft seal 54 arranged in the outer wall of the pump casing 2. As mentioned above, the external part 27 of the pump shaft 26 has a coupling end for connection with a not shown motor shaft, and the rotatable disc 52 is mounted on the external part 27 of the pump shaft 26. In the illustrated embodiment, the rotatable disc 52 is clamped on a ring of the shaft seal 54. However, in the case of larger pumps, it may be preferred that the rotatable disc 52 is arranged higher on the pump shaft 26, nearer to the coupling 29. The rotatable disc 52 is easily accessible outside the casing 2 of the pump 1 and does not take up space inside the pump casing. The rotatable disc 52 is directly accessible and visible so that is may be controlled that it is correctly mounted and so that is may be easily serviced. It is furthermore an advantage that the magnets 53 of the rotatable disc 52 do not have to come into contact with the fluid pumped by the centrifugal pump 1. Therefore, the choice of material for the magnets 53 is greater. For instance, neodymium-magnets may be used which are much stronger than standard permanent magnets. Neodymium-magnets should not be used in contact with drinking water.

Figure 4:
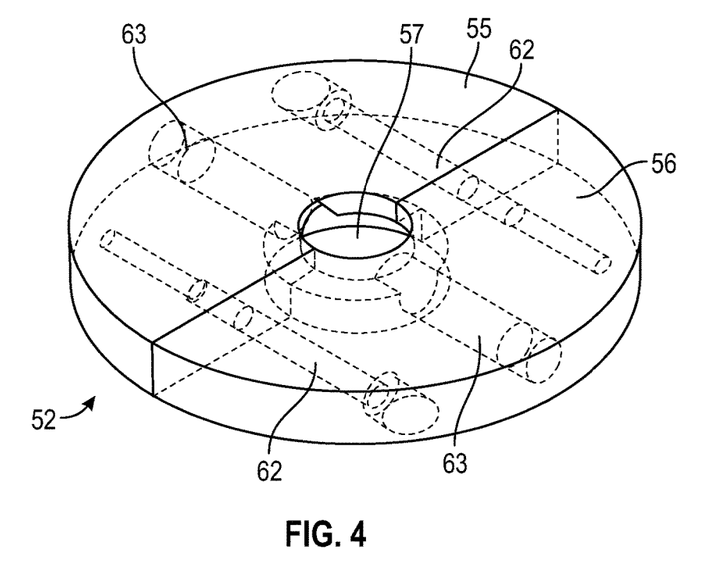
FIG. 4 is a perspective view illustrating a rotatable disc of the centrifugal pump of FIG. 1.
Figure 5:
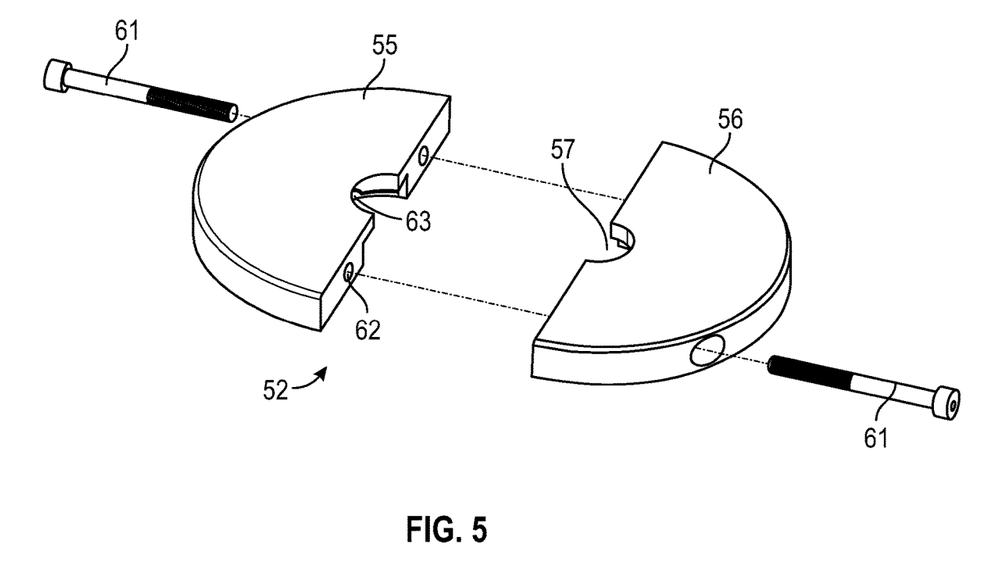
FIG. 5 is a perspective exploded view illustrating the rotatable disc of FIG. 4.

In the embodiment illustrated in FIGS. 4 and 5, the rotatable disc 52 is composed by two disc halves 55, 56 clamped together and thereby clamping the pump shaft 26 in a central hole 57 through the rotatable disc 52. The disc halves 55, 56 are clamped together by means of screws mounted in screw holes 62. As indicated in FIG. 4, the permanent magnets 53 of the rotatable disc 52 may be mounted in the disc in that they are inserted in the radially outer parts of centrally open holes 63. However, the rotatable disc 52 may be constructed in any other suitable way. The material of the rotatable disc 52 is preferably metal, such as aluminium, but any suitable material may be used. In the illustrated embodiment, two permanent magnets 53 are arranged symmetrically at the periphery of the rotatable disc 52. However, any other suitable number of permanent magnets 53 could be used, including one, as well as three or more. Furthermore, the permanent magnets 53 could be arranged at varying angular distance in order to be able to determine the rotation direction of the rotatable disc 52.

As seen in FIG. 2, the sensor housing 48 is elongated and extends through the opening 46 formed in the outer wall of the pump casing 2. The sensor housing 48 includes a first part 58 arranged inside the pump casing 2 and a second part 59 arranged outside the pump casing. The first magnetic flux sensor 50 is arranged in the first part 58 of the sensor housing 48, and the second magnetic flux sensor 51 is arranged in the second part 59 of the sensor housing 48. The position of the first magnetic flux sensor 50 may be optimised in that it may be positioned very close to the position of the magnets 42 of the turbine wheel 32 and inside the pump casing, so that the magnetic field of the turbine wheel does not have to be detected through the pump casing 2. A short distance between the first magnetic flux sensor 50 and the magnets 42 of the turbine wheel 32 will reduce possible disturbances of the signal. On the other hand, also the position of the second magnetic flux sensor 51 may be optimised in that it may be positioned outside the pump casing 2, so that the magnetic field of the magnets 53 of the rotatable disc 52 does not have to be detected through the pump casing. Thereby, the provided first and second measurement signals may be even more reliable.

As illustrated in FIG. 2, the first magnetic flux sensor 50 and the second magnetic flux sensor 51 are arranged in the sensor housing 48 with a mutual first distance d1 in a longitudinal direction L of the sensor housing 48. The first magnetic flux sensor 50 is arranged at a, during rotation of the turbine wheel 32, shortest second distance d2 from the at least one permanent magnet 42 of the turbine wheel 32. The second magnetic flux sensor 51 is arranged at a, during rotation of the rotatable disc 52, shortest third distance d3 from the at least one permanent magnet 53 of the rotatable disc 52. The shortest third distance d3 is at least 2 times, preferably at least 2.5 times, and most preferred at least 3 times, the shortest second distance d2. The mutual first distance d1 is within ±30 percent, preferably within ±20 percent, and most preferred within ±10 percent of the shortest third distance d3.

Preferably, at least the second magnetic flux sensor 51 is of an omnidirectional type. Thereby, the exact position of the rotatable disc 52 in relation to the second magnetic flux sensor 51 may not be critical. This may be an advantage, for instance because the same sensor housing design may be used for centrifugal pumps of different size, whereby a preferred position of the rotatable disc 52 on the pump shaft 26 may vary due to various constructional considerations.

Preferably, the first magnetic flux sensor 50 has a direction of maximum sensitivity, and the first magnetic flux sensor 50 is arranged with its direction of maximum sensitivity extending in the longitudinal direction L of the sensor housing 48 and in the direction of the, during rotation of the turbine wheel 32, closest position of the at least one permanent magnet 42 of the turbine wheel 32. Thereby, the sensitivity of the first magnetic flux sensor 50 may be maximised. This may be advantageous in order to obtain a reliable first measurement signal without using special magnets providing a stronger magnetic field.

According to the present invention, the flow measuring device 3 includes a not shown processor adapted to calculate an uncorrected delivery flow on the basis of the first measurement signal generated by at least one magnetic flux sensor 50, 51 as a result of the rotation of the turbine wheel 32. The processor is adapted to calculate a corrected delivery flow by correcting the uncorrected delivery flow by means of a correction factor based on the second measurement signal generated by the at least one magnetic flux sensor 50, 51 as a result of the rotation of the rotatable disc 52.

The first and second magnetic flux sensors 50, 51 may be Hall sensors, however, coil sensors may be preferred due to better sensitivity.

LIST OF REFERENCE NUMBERS

L longitudinal direction of sensor housing
1 centrifugal pump
2 pump casing
3 flow measuring device
4 casing lower part
6 casing middle part
8 casing upper part
10 fluid inlet
12 fluid outlet
14 pump stage
16 housing
18 impeller
20 diffuser
22 opening
24 pressure chamber
26 pump shaft
27 external part of pump shaft
28 motor stool
29 coupling
30 annular gap
32 turbine wheel
34 hub of turbine wheel
36 blade of turbine wheel
38 outer ring of turbine wheel
40 blade of impeller
42 permanent magnet of turbine wheel
44 recess of turbine wheel
46 vent opening of casing upper part
48 sensor housing
50 first magnetic flux sensor
51 second magnetic flux sensor
52 rotatable disc
53 permanent magnet of rotatable disc
54 shaft seal
55, 56 disc half of rotatable disc
57 central hole of rotatable disc
58 first part of sensor housing
59 second part of sensor housing
60 ring of shaft seal
61 screws
62 screw holes
63 holes for magnets
64 electric connection for sensor housing

The invention claimed is:

1. A centrifugal pump including a pump shaft, a pump casing enclosing at least one pump stage with an impeller mounted on an internal part of the pump shaft and fixed to the pump shaft for rotation with the pump shaft, a flow measuring device configured to measure a delivery flow through the centrifugal pump by a turbine wheel arranged in the pump casing rotationally about the pump shaft and rotationally in relation to the pump shaft, the turbine wheel being exposed to the delivery flow through the centrifugal pump, the turbine wheel including at least one permanent magnet, the flow measuring device including at least one magnetic flux sensor, the flow measuring device being configured to measure the delivery flow on a basis of at least a first measurement signal generated by the at least one magnetic flux sensor as a result of a rotation of the turbine wheel, and the at least one magnetic flux sensor being arranged in a sensor housing-mounted in an opening formed in an outer wall of the pump casing, wherein that a rotatable disc is mounted on the pump shaft and fixed to the pump shaft for rotation with the pump shaft, wherein the rotatable disc includes at least one permanent magnet, and wherein the flow measuring device is configured to include in a measurement of the delivery flow a second measurement signal generated by the at least one magnetic flux sensor as a result of the rotation of the rotatable disc.

2. The centrifugal pump according to claim 1, wherein the pump shaft extends through a shaft seal-arranged in the outer wall of the pump casing, wherein an external part of the pump shaft has a coupling end for connection with a motor shaft, and wherein the rotatable disc is mounted on the external part of the pump shaft.

3. The centrifugal pump according to claim 2, wherein the rotatable disc is composed by two disc halves clamped together and thereby clamping the pump shaft in a central hole through the rotatable disc.

4. The centrifugal pump according to claim 1, wherein the at least one magnetic flux sensor includes a first magnetic flux sensor and a second magnetic flux sensor, wherein the first magnetic flux sensor is configured to generate the first measurement signal as the result of the rotation of the turbine wheel, and wherein the second magnetic flux sensor is adapted to generate the second measurement signal as the result of the rotation of the rotatable disc.

5. The centrifugal pump according to claim 4, wherein the sensor housing is elongated and extends through the opening-formed in the outer wall of the pump casing, wherein the sensor housing-includes a first part arranged inside the pump casing and a second part arranged outside the pump casing, wherein the first magnetic flux sensor is arranged in the first part of the sensor housing, and wherein the second magnetic flux sensor is arranged in the second part of the sensor housing.

6. The centrifugal pump according to claim 4, wherein the first magnetic flux sensor and the second magnetic flux sensor are arranged in the sensor housing with a mutual first distance in a longitudinal direction of the sensor housing, wherein the first magnetic flux sensor is arranged, during rotation of the turbine wheel, at a shortest second distance from the at least one permanent magnet of the turbine wheel, wherein the second magnetic flux sensor is arranged, during rotation of the rotatable disc, at a shortest third distance from the at least one permanent magnet of the rotatable disc, and wherein the shortest third distance is at least 2 times, or at least 2.5 times, or at least 3 times the shortest second distance.

7. The centrifugal pump according to claim 6, wherein the mutual first distance is within ±30 percent, or within ±20 percent, or within ±10 percent of the shortest third distance.

8. The centrifugal pump according to claim 4, wherein at least the second magnetic flux sensor is of an omnidirectional type.

9. The centrifugal pump according to claim 6, wherein the first magnetic flux sensor has a direction of maximum sensitivity, and wherein the first magnetic flux sensor is arranged with its direction of maximum sensitivity extending in the longitudinal direction of the sensor housing and in the direction of, during the rotation of the turbine wheel, of a closest position of the at least one permanent magnet of the turbine wheel.

10. The centrifugal pump according to claim 1, wherein the flow measuring device includes a processor adapted to calculate an uncorrected delivery flow on the basis of the first measurement signal generated by the at least one magnetic flux sensor as the result of the rotation of the turbine wheel, and wherein the processor is adapted to calculate a corrected delivery flow by correcting the uncorrected delivery flow by a correction factor based on the second measurement signal generated by the at least one magnetic flux sensor as the result of the rotation of the rotatable disc.

11. The centrifugal pump according to claim 2, wherein the at least one magnetic flux sensor includes a first magnetic flux sensor and a second magnetic flux sensor, wherein the first magnetic flux sensor is configured to generate the first measurement signal as the result of the rotation of the turbine wheel, and wherein the second magnetic flux sensor is adapted to generate the second measurement signal as the result of the rotation of the rotatable disc.

12. The centrifugal pump according to claim 5, wherein the first magnetic flux sensor and the second magnetic flux sensor are arranged in the sensor housing with a mutual first distance in a longitudinal direction of the sensor housing, wherein the first magnetic flux sensor is arranged, during rotation of the turbine wheel, at a shortest second distance from the at least one permanent magnet of the turbine wheel, wherein the second magnetic flux sensor is arranged, during rotation of the rotatable disc, at a shortest third distance from the at least one permanent magnet of the rotatable disc, and wherein the shortest third distance is at least 2 times, or at least 2.5 times, or at least 3 times the shortest second distance.

13. The centrifugal pump according to claim 2, wherein the flow measuring device includes a processor adapted to calculate an uncorrected delivery flow on the basis of the first measurement signal generated by the at least one magnetic flux sensor as the result of the rotation of the turbine wheel, and wherein the processor is adapted to calculate a corrected delivery flow by correcting the uncorrected delivery flow by a correction factor based on the second measurement signal generated by the at least one magnetic flux sensor as the result of the rotation of the rotatable disc.

* * * * *